United States Patent Office 3,658,943
Patented Apr. 25, 1972

3,658,943
POLYMER COMPOSITION CONTAINING GRAFT COPOLYMER PROCESSING AID
Nathan D. Field, Allentown, and Kornel D. Kiss, Easton, Pa., Donald H. Lorenz, Basking Ridge, N.J., and Edwin M. Smolin, Easton, Pa., assignors to GAF Corporation, New York, N.Y.
No Drawing. Filed Dec. 30, 1969, Ser. No. 889,330
Int. Cl. C08f 29/24, 29/30, 29/50
U.S. Cl. 260—876 R          9 Claims

ABSTRACT OF THE DISCLOSURE

An easily processable resin composition comprising
(a) a normally difficultly processable thermoplastic resin, of the type of vinyl chloride polymer and their chlorination products; and
(b) in an amount sufficient to effect an improvement in the processability of said normally difficultly processable thermoplastic resin, a graft copolymer comprising methyl methacrylate grafted onto an alkyl vinyl ether backbone polymer, the methyl methacrylate units being present in an amount of 10–95% by weight and the alkyl vinyl ether backbone polymer being present in an amount of 5–90% by weight based on the total weight of the grafted copolymer.

---

The present invention is directed to novel polymeric compositions and methods of producing the same; more particularly, the present invention is directed to a novel polymeric composition comrising a normally difficultly processable resin and, a processing aid comprising a graft copolymer of methyl methacrylate on an alkyl vinyl ether backbone polymer.

Plastic or polymeric materials are seldom used in their original form. A variety of additives is generally applied to overcome their inherent limitations and render them more suitable for the intended application. Among others, stabilizers, plasticizers, pigments, fillers, impact improvers, lubricants and processing aids can be added to the basic resin, usually at low or moderate concentration in order to modify a particular characteristic of the plastic or polymeric material.

Of the aforementioned additives, processing aids serve the purpose of improving the processability of the plastic material while in the molten state. This improvement may involve one or more of the processing characteristics of the plastic material, and sometimes is difficult to define or express in numerical values. Nevertheless, the change in the processability is real, and results either in decrease in manufacturing cost, in improvement in product quality or in the combination of both.

With regard to improvement in the processability of a plastic or polymeric material through the addition of a processing aid, it is pointed out that no established standard is available to assess the effectiveness of the processing aid. Accordingly, in order to determine the effectiveness of the processing aid to be hereinafter defined in accordance with the polymeric compositions of the present invention, a comparative technique was herein developed such as will be defined herein below. The effectiveness of the processing aids employed in accordance with the compositions of the present invention effects an improvement in the processability of a difficultly processable rigid polyvinyl chloride resin.

Based upon the above, it is accordingly a principal objective of the present invention to provide a novel polymeric composition which, as previously indicated, provides for improved processability of the basic plastic or polymeric material.

It is further object of the present invention to provide such a polymeric composition comprising difficultly processable polyvinyl chloride or chlorinated polyvinyl chloride and a graft copolymer serving as a processing aid.

It is still a further object of the present invention to provide such a polymeric composition of improved processability wherein such composition comprises a normally difficultly processable polymeric material and as a processing aid a graft copolymer of methyl methacrylate on an alkyl ether backbone polymer.

A still further object of the present invention comprises such a polymeric composition of improved processability comprising a difficultly processable polymer such as a polyvinyl chloride polymer and, in a sufficient amount to improve the processing characteristics of said polymer, a graft copolymer of methyl methacrylate on an alkyl vinyl ether backbone polymer.

Still further objects and advantages of the novel polymeric composition of improved processability and the method of providing the same will become more apparent from the following more detailed description of the present invention.

The factors influencing plastic processing operations are numerous; more often than not they are related to the intended use of the finished product and they are interrelated to each other to a high extent. The selection of a few basic characteristics is necessarily a simplification, and should be looked upon as such. It has to be clear that variations in intended use of the finished product may change the relative emphasis on the selected processing characteristics, even eliminate some of them or bring in additional ones.

The mechanical power requirement of the extrusion process is one of the crucial factors. It encompasses the power required to transfer the compound from the hopper to the die exit overcoming the gradually increasing pressure, that is needed for the high shear blending of the components in the premolten and molten states. Part of it is converted to heat, increasing the melt temperature, and especially on a larger scale, the heat has to be dissipated to prevent overheating and build up of thermal history in the product. One of the roles of the processing aids can be to decrease the power requirement especially at high processing rates. The advantage is partly economic, less kilowatt hours required per unit product, and is partly related to indirect effects on productivity, such as facilitating the increase in equipment size by minimizing limitations due to power transmission or heat dissipating ability of construction materials used. At any rate the decrease in power requirement is an important effect of the subject processing aids, especially in combination with high processing rates.

The productivity of the processing equipment is a highly significant characteristic. The economic advantage of its increase is obvious; higher productivity results in lower depreciation cost per unit product, a significant advantage at the high tooling cost level of this industry. The limits for the processing rate can be established by mechanical limitations due to the equipment and/or by limitations due to the melt flow properties of the compounded resin. One of the peculiar aspects of extrusion is the appearance of melt fracture, which is an irregularity of the surface of the extrudate. The ability of a processing aid to elimniate melt fracture at a given processing rate or to allow the use of a higher rate is highly desired. This property, therefore, was selected as the basis for grading the compositions of the present invention and to compare their performance to well established commercial products.

As indicated previously in order to evaluate the effectiveness of the polymeric compositions of the present invention, experimental work was done primarily with respect to extrusion as employed by the plastics industry. It should be understood, however, that the compositions of the present invention including the processing aid to be hereinafter defined can be advantageously employed in a variety of plastic processing operations such as the various forming and shaping operations, molding, calendaring, vacuum forming, etc.

Similarly, it is pointed out that in order to evaluate the processability of the compositions produced in accordance with the present invention, a great deal of experimental work has been done with respect to improving the processability of a rigid polyvinyl chloride resin, a material which is normally difficultly processable. Thus for example, other polymeric materials include other forms of polyvinyl chloride resins including moderately plasticized polyvinyl chloride, copolymers of vinyl chloride with additional monomers, e.g., vinylidene chloride, vinyl acetate, vinyl alcohol, etc., as well as other derivatives of polyvinyl chloride including for example, post or after chlorinated polyvinyl chloride.

With respect to polyvinyl chloride resins, it is pointed out that the inherent physical properties of the same are generally acceptable so that attempts have been made to improve the processing of such materials without sacrificing these inherent properties. In this regard, where previous processing aids have failed, the compositions of the present invention show a remarkable lack of any interference with the crucial inherent physical properties of the base polymeric material. In this regard, for example, the physical properties related to the glass transition temperature are virtually not effected and strength properties show no deterioration measurable by standard ASTM methods.

Accordingly, the hereinafter defined polymeric compositions constituting the present invention show an extremely advantageous combination of key factors: the decrease in power requirement, the extrusion rate increasing effect and the preservation of the key inherent physical properties of the polymer. Thus, in accordance with the present invention, it has been discovered that all of these characteriistics are available by use of the hereinbelow defined processing aid.

The processing aids which are employed in the plastic or polymeric compositions of the present invention comprise graft copolymers of methyl methacrylate grafted onto an alkyl vinyl ether backbone polymer. Such graft copolymers per se are the subject of copending patent application Ser. No. 864,882 filed Oct. 8, 1969. Accordingly, such copending application is referred to herein for a more full description of the manner in which such graft copolymers can be produced.

The alkyl vinyl ether polymers or copolymers comprising the backbone polymer of the graft copolymer employed as the processing aid in accordance with the novel compositions of the present invention are polymeric materials which are prepared by a variety of polymerization techniques. Such alkyl vinyl ether backbone polymer or copolymer is generally one having a molecular weight such that the polymer is characterized by having a K value within the range of 20–110, preferably within the range of 30–100.

The K value is a number calculated from dilute solution viscosity measurements of a polymer and is used to denote the degree of polymerization or molecular weight. The formula for calculating the K value is as follows:

$$\log (N_s/N_o) = \frac{75 K^2}{1+1.5 Kc} + K$$

where $N_s$ = viscosity of the solution
$N_o$ = viscosity of the solvent
$c$ = concentration in grams per ml.

The poly(alkyl vinyl ethers) may consist of polymerized alkyl vinyl ethers of which lower alkyl ($C_1$–$C_4$) vinyl ethers constitute 0–100 parts and higher ($C_5$–$C_{32}$) alkyl vinyl ethers constitute 0–100 parts making up a total of 100 parts by weight. The poly(vinyl ethers) can be in the form of random, graft or block copolymers or as mixtures of homopolymers or copolymers.

Thus, lower alkyl vinyl ethers constituting from 0 to 100 parts per 100 parts of the poly(alkyl vinyl ether) polymer or copolymer can suitably be:

methyl vinyl ether
ethyl vinyl ether
n-propyl vinyl ether
isopropyl vinyl ether
n-butyl vinyl ether
isobutyl vinyl ether
t-butyl vinyl ether Similarly, the higher alkyl vinyl ethers which again can constitute 0 to 100 parts per 100 parts of the poly(alkyl vinyl ether) can comprise:

n-amyl vinyl ether
isoamyl vinyl ether
t-amyl vinyl ether
n-hexyl vinyl ether
n-heptyl vinyl ether
n-octyl vinyl ether
isooctyl vinyl ether
2-ethyl hexyl vinyl ether
decyl vinyl ether
dodecyl vinyl ether (lauryl vinyl ether)
tetradecyl vinyl ether
hexadecyl vinyl ether (cetyl vinyl ether)
octadecy vinyl ether
eicosyl vinyl ether
docosyl vinyl ether
tricosyl vinyl ether
tetracosyl vinyl ether
pentacosyl vinyl ether
triacontyl vinyl ether
etc.

Thus, the poly(alkyl vinyl ether) backbone polymer of the graft copolymer of the present invention can advantageously comprise a homopolymer of any of the above lower alkyl or higher alkyl vinyl ethers or copolymers of lower or higher alkyl vinyl ethers or mixtures of these polymers in any percentage. Thus, for example, suitable copolymers which can be advantageously employed in accordance with the present invention include copolymers of methyl vinyl ether/2-ethyl hexyl vinyl ether (53/47 parts by weight) and of methyl vinyl ether-cetyl vinyl ether (70/30 parts by weight).

As indicated above, the graft copolymers employed as processing aids in accordance with the novel compositions of the present invention are those which consist of methyl methacrylate grafted onto the alkyl vinyl ether polymer or copolymer backbone. In addition, however, it is pointed out that in addition to the methyl methacrylate grafted onto the polymer or copolymer backbone, one or more optional additional monomers may be copolymerized with the methyl methacrylate. When methyl methacrylate is employed as the sole monomeric unit in the graft copolymer employed in accordance with the novel composition of the present invention, the same is generally employed in a weight ratio of 10–95% by weight to 5–90% by weight of the alkyl vinyl ether polymer or copolymer.

In addition to the methyl methacrylate, the grafted copolymer can have additional monomers such as styrene and/or acrylonitrile grafted onto the alkyl vinyl ether polymer or copolymer backbone.

In producing such a graft copolymer using a mixture of monomers, the styrene can be employed such that the same is present in an amount up to 80% by weight based upon the total weight of the graft copolymer. Similarly, the acrylonitrile can be employed such that the same is present in an amount of up to 10 parts by weight based upon the weight of the total graft copolymer.

In accordance with a preferred embodiment of the present invention, the graft copolymer composition includes 10 to 35% by weight of the alkyl vinyl ether polymer or copolymer, and 65 to 90% by weight of the methyl methacrylate units. Again, in accordance with a preferred embodiment of the present invention, the acrylonitrile units can be present in an amount of from 0 to 10% by weight, the styrene being present in an amount of 0 to 25% by weight.

It is pointed out that there are various methods by which a graft copolymer such as defined above can be produced. All such methods for producing the graft copolymers employed as the processing aid in accordance with the novel compositions of the present invention are fully described in copending application Ser. No. 864,882 filed Oct. 8, 1969 discussed above. Accordingly, the method of preparing such graft copolymers as illustrated in such application is incorporated herein by reference.

It is additionally pointed out with respect to the graft copolymers employed as the processing aid in accordance with the novel compositions of the present invention, that within the limits previously set forth with respect to the methyl methacrylate and alkyl vinyl ether polymer or copolymer functionality as well as the additional use of the optional vinyl monomers, the graft copolymers are those in which the same have a molecular weight characterized by a K value within the range of 20–110, preferably within the range of 30–100.

In preparing the novel compositions of the present invention, the processing aid i.e., graft copolymer of methyl methacrylate on an alkyl vinyl ether polymer or copolymer backbone can be added to the basic plastic or polymeric material at any stage during its processing. In this regard, it has been discovered in accordance with the present invention that the addition of a relatively small amount of the graft copolymer can effect an improvement in the processability of the normally difficultly processable polymer including, for example, the demonstration of high rates of extrusion, an elimination of the melt fracture at a given processing rate etc. In this regard, the processing aid of the present invention need only be employed in the novel compositions in that minor amount effective to achieve an improvement in the processability of the normally difficulty processable polymer. Generally, the processing aid, i.e., graft copolymer is added to the polymeric composition in an amount of about 0.5% to about 10% by weight, preferably from about 1% to about 5% by weight based upon the weight of the total polymer composition. In this regard, specifically with respect to polyvinyl chloride and related resins it has been discovered that the employment of such a minor amount of the graft copolymer allows for the improvement of the processability of the resin while in no way affecting the generally good characteristics of the base resin. Thus, for example, a polyvinyl chloride resin composition containing up to about 10% of the graft copolymer processing aid shows an ability to withstand high rates of extrusion with an accompanying low power requirement during extrusion and an elimination or substantial elimination of the melt fracture phenomenon. In this way, it is possible to produce polyvinyl chloride and similar resin compositions having excellent mechanical and processing characteristics. The specific stabilizer employed in the following examples was Thermolite 31. However, it should be understood that other known stabilizers for polyvinyl chloride such as compounds of barium, cadmium, zinc, lead, tin, calcium, and phenols, phosphites and the like, may be employed if desired.* As is known in the art, such stabilizers are normally employed in an amount of 0.2 to 7% by weight of the formulated product. The novel compositions of the present invention will now be illustrated by reference to the following specific examples.

EXAMPLE 1

Preparation of graft copolymer of methyl methacrylate grafted onto a copolymer of methyl vinyl ether/2-ethylhexyl vinyl ether To a stainless steel 5 gallon reactor equipped with 4 blade turbine agitator, were charged, 800 g. of 50% solids solution of poly(methyl vinyl ether/2-ethylhexyl vinyl ether) (53/47 wt. percent) in methyl methacrylate, 1200 g. of low inhibitor grade methyl methacrylate, 800 g. of deionized water, containing 0.48 g. of $Na_2HPO_4$, and 11.8 g. of vinyl pyrrolidone/vinyl acetate copolymer (S–630) and 20.0 g. benzoyl peroxide. Air was purged by pulling a vacuum and releasing three times with nitrogen. Temperature was brought to 75° over 1¾ hours and maintained at 75° for 2 hours, the temperature was then raised to 85° and held at that temperature for 3 hours.

After cooling to room temperature the white slurry was filtered and washed 3 times with water and dried. The total yield of dry product was 1951 g. which had a relative viscosity 0.5% in benzene of 2.15, 1.0% in benzene of 2.20 and a K value of 50.

EXAMPLE 2

The processing aid produced in Example 1 was evaluated at the 2, 3.5 and 5% levels in polyvinyl chloride. Mixtures were prepared containing 0, 2, 3.5 and 5% of the processing aid and 100, 98, 96.5 and 95% of Diamond Shamrock PVC–450, a high molecular weight suspension type polyvinyl chloride resin suitable for extrusion of pipes and profiles. In addition, each compound contained 3% of Thermolite 31, an organotin stabilizer by M & T Company.

The compounds were prepared by mixing the processing aid, the stabilizer and 20% of the PVC resin in a high intensity mixer and blending this "concentrate" with the remaining 80% resin.

The extruder consisted of an I.D. ¾" x 15" barrel (1 to 20 ratio) with a screw designed for rigid PVC extrusion. The driving mechanism was attached to a Brabender plastograph and the torque recorded. The barrel had two independent heating zones controlled automatically. The die was a 1" x 0.02" rectangular ribbon die also electrically heated and automatically controlled. Screw speed was varied between 10 and 100 r.p.m. with increments of 10 r.p.m.

The extruder was preheated to zone 1=360, zone 2=400 and die=410° F., the screw speed adjusted to 10 r.p.m. and the composition was fed into the hopper. After conditions were stabilized, the extrudate was inspected, remarks regarding its characteristics were recorded along with the temperature and torque data, and the screw speed was increased by 10 r.p.m. This procedure was repeated until at least 60 r.p.m. was reached. In some cases r.p.m. values as high as 100 were reached to explore the limitations of the compound investigated.

The compounds were evaluated on the following basis: Development of frictional heat. Higher temperatures decrease melt viscosity and torque and tend to improve the quality of extrudate. In order to keep conditions on a comparative basis, attempts were made to avoid conditions resulting in the development of excessive frictional heat such as prolonged operation at very high screw speed, and sufficient time was allowed to return to normal temperature after a high speed test was terminated. Only data obtained at comparable temperatures was included in the evaluation.

Relative torque was measured and recorded by the dynamometer section of the base instrument. The scale of 0 to 100 is equivalent to 1000 to 10,000 meter-grams. These values are somewhat influenced by variations in the melt temperature, high temperature resulting in lower melt vis- ---
*A number of such specific stabilizers are disclosed in Modern Plastics Encyclopedia, Issue for 1968, pp. 437–466 and pp. 510–512.

cosity and lower relative torque. Since the temperatures were kept in a narrow range the assignment of differences in relative torque values to inherent properties of the compounds is justified.

Melt fracture point is expressed as the screw speed in r.p.m. at which melt fracture occurs. Higher extrusion rates can be used with compounds containing processing aids without deterioration in the quality of extrudate. Appearance of melt fracture clearly indicates that the extruder is operated at excessive speed resulting in an unacceptable product. Since the screw speed was varied by increments of 10 r.p.m. the accuracy of melt fracture point is limited to this range. In other words, a melt fracture point of e.g. 70 means that no melt fracture occurs at 60 r.p.m. screw speed, and it is observable at 70 r.p.m.

Melt index of the extruded compound was determined according to ASTM. It is a measure of melt viscosity, and its accuracy is limited to ±0.1 decigram/min.

The results of the experiments are shown in Table 1. Data for 30 r.p.m. show significant decrease in relative torque with increasing processing aid concentration at substantially identical temperatures. Data regarding melt fracture characteristics show a more than tenfold increase in melt fracture point. The value, 100+, means that no melt fracture was observed at 100 r.p.m., the highest speed of the extruder. They also show a decreasing torque, i.e., decreasing power requirement in spite of the dramatic increase in extrusion rates.

The variation in melt index values is within the limits of experimental error.

TABLE 1

Effect of processing aid based on copolymers of methyl vinyl ether and 2-ethyl hexyl vinyl ether

| Experiment number | 2-1 | 2-2 | 2-3 | 2-4 |
|---|---|---|---|---|
| Composition of compound, parts: | | | | |
| Processing aid | 0 | 2 | 3.5 | 5 |
| PVC resin | 100 | 98 | 96.5 | 95 |
| Stabilizer | 3 | 3 | 3 | 3 |
| Extrusion characteristics at 30 r.p.m.: | | | | |
| Temperature, °F.: | | | | |
| Zone 1 | 370 | 365 | 368 | 365 |
| Zone 2 | 400 | 400 | 420 | 400 |
| Die | 430 | 426 | 430 | 425 |
| Torque, relative units | 82-87 | 50-56 | 40-44 | 42-47 |
| Melt fracture characteristics: | | | | |
| Melt fracture point, r.p.m | 10 | 40 | 70 | 100+ |
| Temperatures at M.F.P., °F.: | | | | |
| Zone 1 | 360 | 365 | 370 | 1 380 |
| Zone 2 | 416 | 400 | 420 | 1 410 |
| Die | 420 | 425 | 425 | 1 425 |
| Torque at M.F.P., rel. units | 67-72 | 53-58 | 41-54 | 1 40-48 |
| Melt index, decigram/min | 0.1 | 0.1 | 0.2 | 0.2 |

1 Measured at 100 r.p.m.

EXAMPLE 3

Employing the graft copolymer produced in Example 1 at the 5% level in a polyvinyl chloride resin, various physical properties associated with the incorporation of the processing aid were determined.

The physical properties investigated belong to the following three groups:

(1) properties related to glass transition temperature
(2) strength properties at ambient temperature
(3) thermal stability The glass transition temperature related properties are customarily expressed as deflection temperature. This is the temperature at which marked deflection occurs when a test specimen is subjected to constant stress at uniformly increasing temperature. The test procedure is defined in ASTM-D648. The expected reproducibility of the test is ±1° C. The significant fact is, no decrease occurred in the deflection temperature of the mixtures compared to the unmodified PVC.

Strength properties at ambient temperature also determine the usefulness of plastic objects. The requirements in this respect are as numerous as the application of objects made of plastics and often the applicability of the compound is judged by its actual performance in that application. Prediction of applicability is based on basic standardized tests such as determination of tensile properties (ultimate tensile strength, elongation and elastic modulus), impact strength and flexural characteristics.

As can be seen from Table 2, no deterioration in the strength properties resulted from the inclusion of our processing aid in PVC.

Thermal stability is judged by the so-called oven test method in which 1" x 1" test specimens are exposed to heat in an air circulating oven, individual specimens are removed after 10, 20, 30, etc., minutes of exposure and the time of developing dark brown color is noted. This test is applicable only as a relative test. It has to be restricted to the comparison of specimens of equal heat history and to simultaneous exposure. The following tests satisfied these requirements. They were carried out at 400° F. in an oven with revolving shelves to equalize exposure conditions and in the presence of a control compound.

The graft copolymer of Example 1 was evaluated at the 5% level. The processability was judged on basis of melt fracture point, i.e., the extruder screw speed at which melt fracture was observed. The extrudate was cut to small pieces and used to prepare compression molded specimens according to the requirements of ASTM procedures.

TABLE 2

Effect of processing aid based on copolymers of methyl vinyl ether and 2-ethylhexyl vinyl ether

| Experiment number | 3-1 | 3-2 |
|---|---|---|
| Composition of compound, parts: | | |
| Processing aid | 0 | 5 |
| PVC resin | 100 | 95 |
| Stabilizer | 3 | 3 |
| Processability characteristics: Melt fracture point in extrusion, r.p.m | 10 | 100+ |
| Physical properties of processed compound: | | |
| Deflection temperature, °C | 69 | 71 |
| Melt index, grams/10 min | 0.1 | 0.2 |
| Ultimate tensile strength, p.s.i | 7,800 | 8,450 |
| Ultimate elongation, percent | 3.8 | 3.7 |
| Tensile modulus, p.s.i | 380,000 | 435,000 |
| Flexural yield strength, p.s.i | 14,100 | 15,000 |
| Impact strength, ft. lbs./in. of notch | 0.5 | 0.8 |
| Heat stability, min | 50 | 60 |

EXAMPLE 4

Methyl methacrylate was grafted on to a copolymer of of methyl vinyl ether (70%) and lauryl vinyl ether (30%) at a ratio of 20 to 80 parts by weight. The product was blended with PVC resin, and extruded according to Example 2. Table 3 compares extrusion characteristics of these compounds. Slight differences between the first columns of Table 1 and Table 3 are due to the limitations in reproducibility; both columns relate to characteristics of the basic PVC resin containing no processing aid, and ideally should give equivalent numerical results.

The addition of the processing aid decreases the torque at identical screw speeds and increases the melt fracture point as defined in Example 2. Even at the higher speeds at which melt fracture occurs the torque is less than that for the PVC resin with no processing aid.

The stability and strength properties were not affected.

TABLE 3

Effect of processing aid based on methyl and lauryl vinyl ether copolymers

| Experiment number | 4-1 | 4-2 | 4-3 | 4-4 |
|---|---|---|---|---|
| Composition of compound, parts: | | | | |
| Processing aid | 0 | 2 | 3.5 | 5 |
| PVC resin | 100 | 98 | 96.5 | 95 |
| Stabilizer | 3 | 3 | 3 | 3 |
| Extrusion characteristics at 30 r.p.m.: | | | | |
| Temperature, °F.: | | | | |
| Zone 1 | 370 | 369 | 365 | 360 |
| Zone 2 | 415 | 425 | 420 | 420 |
| Die | 430 | 430 | 420 | 430 |
| Torque, relative units | 70-92 | 61-71 | 58-74 | 56-68 |
| Melt fracture characteristics: | | | | |
| Melt fracture point, r.p.m | 10 | 30 | 40 | 60 |
| Temperatures at M.F.P. °F.: | | | | |
| Zone 1 | 360 | 369 | 370 | 375 |
| Zone 2 | 400 | 425 | 430 | 425 |
| Die | 420 | 430 | 430 | 430 |
| Torque at M.F.P., rel. units | 68-76 | 61-71 | 60-68 | 50-64 |
| Melt index, decigram/min | 0.1 | 0.1 | 0.1 | 0.1 |

EXAMPLE 5

The compounding and testing procedure of Example 2 was repeated with a processing aid based on a copolymer of methyl vinyl ether and cetyl vinyl ether at 70:30 ratio onto which methyl methacrylate was grafted at 1 to 4 ratio.

The effect of the processing aid was similar to those described in Example 2.

TABLE 4

Effect of processing aid based on methyl and cetyl vinyl ether copolymers

| Experiment number | 4-1 | 4-2 | 4-3 | 4-4 |
|---|---|---|---|---|
| Composition of compound, parts: | | | | |
| Processing aid | 0 | 2 | 3.5 | 5 |
| PVC resin | 100 | 98 | 96.5 | 95 |
| Stabilizer | 3 | 3 | 3 | 3 |
| Extrusion characteristics at 30 r.p.m.: | | | | |
| Temperature, °F.: | | | | |
| Zone 1 | 370 | 365 | 365 | 365 |
| Zone 2 | 400 | 400 | 400 | 400 |
| Die | 430 | 420 | 425 | 425 |
| Torque, relative units | 82-87 | 80-84 | 63-71 | 55-62 |
| Melt fracture characteristics: | | | | |
| Melt fracture point, r.p.m | 10 | 10 | 30 | 50 |
| Temperatures at M.F.P., °F.: | | | | |
| Zone 1 | 360 | 360 | 365 | 365 |
| Zone 2 | 416 | 400 | 400 | 405 |
| Die | 420 | 420 | 425 | 420 |
| Torque at M.F.P., rel. units | 67-72 | 70-72 | 63-71 | 55-65 |
| Melt index, decigram/min | 0.1 | 0.1 | 0.1 | 0.1 |

EXAMPLE 6

The same graft copolymer as in Example 5 were again incorporated into a polyvinyl chloride resin at the 5% level and tested as in Example 3. Like Example 3, the incorporation of this processing aid showed improved processability without a decrease in the mechanical properties of the system. The results are shown in Table 5.

TABLE 5

Effect of processing aid based on copolymers of methyl vinyl ether and cetyl vinyl ether

| Experiment number | 5-1 | 5-2 |
|---|---|---|
| Composition of compound, parts: | | |
| Processing aid | 0 | 5 |
| PVC resin | 100 | 95 |
| Stabilizer | 3 | 3 |
| Processability characteristics: Melt fracture point in extrusion, r.p.m | 10 | 50 |
| Physical properties of processed compound: | | |
| Deflection temperature, °C | 69 | 72 |
| Melt index, grams/10 min | 0.1 | 0.1 |
| Ultimate tensile strength, p.s.i | 7,800 | 8,200 |
| Ultimate elongation, percent | 3.8 | 3.7 |
| Tensile modulus, p.s.i | 380,000 | 449,000 |
| Flexural yield strength, p.s.i | 14,100 | 15,000 |
| Impact strength, ft. lbs/in. of notch | 0.5 | 0.7 |
| Heat stability, min | 50 | 50 |

EXAMPLE 7

As a comparison, a homopolymer of methyl methacrylate was used as a processing aid under the identical conditions as illustrated in Example 2 above so as to evaluate the effect of the alkyl vinyl ether portion of the graft copolymers upon the processability of the normally difficultly processable resin.

Table 6 shows clearly that at 30 r.p.m. extruder screw speed virtually no torque reduction occurs when the processing aid concentration is increased from 0 to 5% by weight. The melt fracture point increases with increasing processing aid concentration. However, this effect is significantly less than that for the processing aids described in Example 2. The torque at melt fracture point also decreases, but to a much lesser degree than in Example 2. This comparison shows that the unexpected effect on processability is associated with the presence of the alkyl chains in the alkyl vinyl ether copolymer.

TABLE 6

Effect of polymethyl methacrylate as processing aid

| Experiment number | 4-1 | 4-2 | 4-3 | 4-4 |
|---|---|---|---|---|
| Composition of compound, parts: | | | | |
| Processing aid | 0 | 2 | 3.5 | 5 |
| PVC resin | 100 | 98 | 96.5 | 95 |
| Stabilizer | 3 | 3 | 3 | 3 |
| Extrusion characteristics at 30 r.p.m.: | | | | |
| Temperature, °F.: | | | | |
| Zone 1 | 365 | 360 | 365 | 360 |
| Zone 2 | 400 | 410 | 415 | 415 |
| Die | 425 | 425 | 425 | 425 |
| Torque, relative units | 80-88 | 81-87 | 80-86 | 80-86 |
| Melt fracture characteristics: | | | | |
| Melt fracture point, r.p.m | 10 | 10 | 20 | 30 |
| Temperatures at M.F.P., °F.: | | | | |
| Zone 1 | 360 | 360 | 365 | 360 |
| Zone 2 | 400 | 410 | 415 | 415 |
| Die | 420 | 425 | 425 | 425 |
| Torque at M.F.P., rel. units | 91-96 | 82-88 | 80-86 | 80-86 |

EXAMPLE 8

A similar comparative example was provided by the addition of poly methyl methacrylate at the 2, 3.5 and 5% level, in order to illustrate the effect upon the addition of such material on the physical characteristics of the base resin. The data shown in Table 7 below illustrates that even at the 5% level the improvement in the processability is but a fraction of that presented in the previous examples illustrating the use of the graft copolymer of methyl methacrylate and the alkyl vinyl ether polymer or copolymer. In addition, the tabulated data illustrates that the impact strength of the specimens was decreased even at the lower concentrations.

TABLE 7

Effect of polymethyl methacrylate as processing aid

| Experiment number | 7-1 | 7-2 | 7-3 | 7-4 |
|---|---|---|---|---|
| Composition of compounds, parts: | | | | |
| Processing aid | 0 | 2 | 3.5 | 5 |
| PVC resin | 100 | 98 | 96.5 | 95 |
| Stabilizer | 3 | 3 | 3 | 3 |
| Processability characteristics: | | | | |
| Melt fracture point in extrusion, r.p.m | 10 | 10 | 20 | 30 |
| Physical properties of processed compound: | | | | |
| Deflection temperature, °C | 69 | 70 | 69 | 70 |
| Ultimate tensile strength, p.s.i | 7,800 | 8,800 | 8,900 | 9,000 |
| Ultimate elongation, percent | 3.8 | 3.3 | 3.7 | 3.7 |
| Tensile modulus, p.s.i | 380,000 | 384,000 | 389,000 | 463,000 |
| Flexural yield strength, p.s.i | 14,100 | | | 14,900 |
| Impact strength, ft. lbs./in. of notch | 0.5 | 0.4 | 0.3 | 0.4 |
| Heat stability, min | 50 | 45 | 45 | 50 |

EXAMPLE 9

A commercially avaliable processing aid, Acryloid KM-607 recommended for applications in rigid vinyl compositions was compared following the procedures of Example 2.

No torque decrease was found at concentrations of 2 and 3.5% by weight at 30 r.p.m. screw speed. At the 5% processing aid concentration the torque decrease was but a fraction of that caused by the processing aids described in Example 2.

The increase in melt fracture point was similar to that obtained with polymethyl methacrylate and described in Example 7. The torque at melt fracture point actually increased at 2 and 3.5% processing aid concentration and was substantially unchanged at 5% concentration.

TABLE 8
Effect of Acryloid KM-607

| Experiment number | 8-1 | 8-2 | 8-3 | 8-4 |
|---|---|---|---|---|
| Composition of compounds, parts: | | | | |
| Processing aid | 0 | 2 | 3.5 | 5 |
| PVC resin | 100 | 98 | 96.5 | 95 |
| Stabilizer | 3 | 3 | 3 | 3 |
| Extrusion characteristics at 30 r.p.m.: | | | | |
| Temperature, °F.: | | | | |
| Zone 1 | 370 | 360 | 365 | 365 |
| Zone 2 | 400 | 410 | 425 | 410 |
| Die | 430 | 430 | 420 | 430 |
| Torque, relative units | 82-87 | 85-87 | 82-86 | 69-72 |
| Melt fracture characteristics: | | | | |
| Melt fracture point, r.p.m | 10 | 10 | 10 | 30 |
| Temperatures at M.F.P., °F.: | | | | |
| Zone 1 | 360 | 360 | 365 | 365 |
| Zone 2 | 416 | 410 | 425 | 410 |
| Die | 420 | 425 | 425 | 430 |
| Torque at M.F.P. rel. units | 67-72 | 83-86 | 73-75 | 69-72 |
| Melt index, decigram/min | 0.1 | 0.1 | 0.1 | 0.1 |

EXAMPLE 10

Another commercially available processing aid, Acryloid K-120N was assessed and compared to unmodified PVC according to the procedures of Example 2. At 30 r.p.m. extruder screw speed the decrease in torque is much less than that with processing aids of Example 2, and is not proportional to the concentration.

The increase in melt fracture point is gradual but less than that for the processing aids subject to this invention. The torque decrease at melt fracture point is also significantly lower than that for the processing aids in Example 2.

TABLE 9
Effect of Acryloid K-120N

| Experiment number | 9-1 | 9-2 | 9-3 | 9-4 |
|---|---|---|---|---|
| Composition of compounds, parts: | | | | |
| Processing aid | 0 | 2 | 3.5 | 5 |
| PVC resin | 100 | 98 | 96.5 | 95 |
| Stabilizer | 3 | 3 | 3 | 3 |
| Extrusion characteristics at 30 r.p.m.: | | | | |
| Temperature, °F.: | | | | |
| Zone 1 | 370 | 360 | 360 | 360 |
| Zone 2 | 400 | 410 | 405 | 400 |
| Die | 430 | 430 | 420 | 420 |
| Torque, relative units | 85-94 | 76-87 | 76-89 | 76-84 |
| Melt fracture characteristics: | | | | |
| Melt fracture point, r.p.m | 10 | 10 | 20 | 30 |
| Temperatures at M.F.P., °F.: | | | | |
| Zone 1 | 360 | 360 | 360 | 360 |
| Zone 2 | 400 | 400 | 405 | 400 |
| Die | 425 | 430 | 430 | 420 |
| Torque at M.F.P., rel. units | 80-86 | 74-80 | 78-82 | 76-84 |
| Melt index, decigram/min | 0.1 | 0.1 | 0.1 | 0.2 |

EXAMPLE 11

The two commercially available processing aids tested in Examples 9 and 10 were again assessed on the 5% level with regard to their effect upon the physical characteristics of the base polyvinyl chloride resin. As seen in the following Table 10, the processing aids which are commercially available besides being less potent processing aids than the graft copolymers of the present invention, caused some deterioration in tensile modulus and in heat stability.

TABLE 10
Effect of commercially available processing aids

| Experiment number | 10-1 | 10-2 | 10-3 |
|---|---|---|---|
| Processing aid, type | None | (1) | (2) |
| Processing aid, parts | 0 | 5 | 5 |
| PVC resin, parts | 100 | 95 | 95 |
| Stabilizer, parts | 3 | 3 | 3 |
| Processability characteristics: Melt fracture point in extrusion, r.p.m | 10 | 30 | 30 |
| Physical properties of processed compound: | | | |
| Deflection temperature, °C | 69 | 69 | 70 |
| Melt index, grams/10 min | 0.1 | 0.2 | 0.1 |
| Ultimate tensile strength, p.s.i. | 7,800 | 8,500 | 7,800 |
| Ultimate elongation, percent | 3.8 | 3.9 | 4 |
| Tensile modulus, p.s.i. | 380,000 | 375,000 | 350,000 |
| Flexural yield strength, p.s.i. | 14,100 | 14,600 | 14,800 |
| Impact strength, ft.-lbs./inch of notch | 0.5 | 0.6 | 0.8 |
| Heat stability, minutes | 50 | 45 | 40 |

[1] Acryloid KO12ON.
[2] Acryloid KM-607.

EXAMPLE 12

A fine particle size, low molecular weight polyethylene resin, Microthene FN-510 was assessed as a processing aid for rigid PVC. The procedures of Example 2 were followed with one exception: only two compounds were compared, one containing no processing aid, and another containing 5% by weight Microthene FN-510 as processing aid.

Torque was drastically reduced at both 30 r.p.m. screw speed and at melt fracture point in the experiment with 5% processing aid.

The melt fracture point did not increase at all and the extrudate with 5% processing aid exhibited a very rough surface and was brittle, contrary to the unmodified PVC which gave a tough extrudate. The melt index for the compound containing 5% polyethylene was 0.7, much higher than that for any of the graft copolymers previously assessed.

The comparison shows that additives may decrease torque in plastic extrusion without possessing other desirable features of a good processing aid such as increasing processing speed while maintaining good surface and preserving strength properties.

TABLE 11
Effect of low molecular weight polyethylene as processing aid

| Experiment number | 11-1 | 11-2 |
|---|---|---|
| Composition of compound, parts: | | |
| Processing aid | 0 | 5 |
| PVC resin | 100 | 95 |
| Stabilizer | 3 | 3 |
| Extrusion characteristics at 30 r.p.m.: | | |
| Temperature, °F.: | | |
| Zone 1 | 370 | 360 |
| Zone 2 | 400 | 405 |
| Die | 430 | 430 |
| Torque, relative units | 85-94 | 38-42 |
| Melt fracture characteristics: | | |
| Melt fracture point, r.p.m | 10 | 10 |
| Temperatures at M.F.P., °F.: | | |
| Zone 1 | 360 | 360 |
| Zone 2 | 400 | 400 |
| Die | 425 | 420 |
| Torque at M.F.P., rel. units | 80-86 | 32-36 |
| Melt index, decigram/min | 0.1 | 0.6 |
| Appearance of extrudate | (1) | (2) |

[1] Clear, colorless, tough.
[2] Opaque, white, brittle.

EXAMPLE 13

Employing the polyethylene of Example 12 at the 5% level, the effect on the physical characteristics of the base polyvinyl chloride was determined as in Example 3. The results are shown in the following Table 12. It can be seen that the extrudate was obviously heterogeneous and tensile strength and flexural yield strength deteriorated. Accordingly, the effect can be described as that of a lubricant rather than that of a processing aid.

TABLE 12
Effect of low molecular weight polyethylene as processing aid

| Experiment number | 12-1 | 12-2 |
|---|---|---|
| Composition of compound, parts: | | |
| Processing aid | 0 | 5 |
| PVC resin | 100 | 95 |
| Stabilizer | 3 | 3 |
| Processability characteristics: Melt fracture point in extrusion, r.p.m | 10 | 10 |
| Physical properties of processed compound: | | |
| Deflection temperature, °C | 69 | 68 |
| Melt index, grams/10 min | 0.1 | 0.7 |
| Ultimate tensile strength, p.s.i. | 7,800 | 7,300 |
| Ultimate elongation, percent | 3.8 | 3.4 |
| Tensile modulus, p.s.i. | 380,000 | 373,000 |
| Flexural yield strength, p.s.i. | 14,100 | 13,100 |
| Impact strength, ft.-lbs./inch of notch | 0.5 | 0.9 |
| Heat stability, minutes | 50 | 50 |

EXAMPLE 14

This example illustrates the effect of variations in processing aid composition on the processability of rigid vinyl compounds. Experiment 14-1 is the control with no processing aid, experiments 14-2, 14-3 and 14-4 relate to compounds with 5% processing aid. The base polymer in experiment 14-2 is poly(vinyl methyl ether) and the graft contains 90% methyl methacrylate. Experiment 14–3 employs a 60% methyl methacrylate grafts on 40% poly(vinyl methyl ether). Methyl methacrylate (80%) was grafted onto cetyl vinyl ether homopolymer (20%) for use in experiment 14–4.

Low vinyl methyl ether containing graft polymer (14–2) shows negligible effect on torque but a marked improvement on melt fracture point. Increase in methyl ether content (14–3) or in alkyl chain length (14–4) drastically reduces torque and dramatically increases melt fracture point with only a moderate increase in melt index.

TABLE 13

Effect of variation in alkyl chain length of alkyl vinyl ether and in methyl methacrylate: alkyl vinyl ether ratio

| Experiment number | 14–1 | 14–2 | 14–3 | 14–4 |
|---|---|---|---|---|
| Composition of processing aid: | | | | |
| ($CH_2$= $CH\_O\_R$)$R_1$= | | $-CH_3$ | $-CH_3$ | $-C_{16}H_{33}$ |
| Percent MMA in grafted product | | 90 | 60 | 80 |
| Percent PVR in grafted product | | 10 | 40 | 20 |
| Composition of compound, parts: | | | | |
| Processing aid | 0 | 5 | 5 | 5 |
| PVC resin | 100 | 95 | 95 | 95 |
| Stabilizer | 3 | 3 | 3 | 3 |
| Extrusion characteristics at 30 r.p.m.: | | | | |
| Temperature, °F.: | | | | |
| Zone 1 | 370 | 370 | 360 | 360 |
| Zone 2 | 410 | 425 | 420 | 415 |
| Die | 68–76 | 65–60 | 24–26 | 14–16 |
| Melt fracture characteristics: | | | | |
| Melt fracture point, r.p.m. | 10 | 30 | 60+ | 100+ |
| Temperatures at M.F.P., °F.: | | | | |
| Zone 1 | 365 | 370 | 365 | 365 |
| Zone 2 | 410 | 425 | 425 | 425 |
| Die | 420 | 420 | 425 | 420 |
| Torque at M.F.P., rel. units | 65–73 | 65–70 | 24–30 | 28 |
| Melt index, decigram/min. | 0.1 | 0.1 | 0.3 | 0.3 |

EXAMPLE 15

Example 2 is repeated except that the poly(vinyl chloride) resin is replaced with a substantially equivalent amount of the following normally difficulty processable polymeric materials:

(A) vinyl chloride/vinyl acetate copolymer (80:20)
(B) vinyl chloride/vinyl acetate copolymer (60:40)
(C) vinyl chloride/vinylidene chloride copolymer (80:20)
(D) plasticized polyvinylchloride (30% butyl phthalate)
(E) post chlorinated polyvinylchloride (69% chlorine)

In all cases, when employing the graft copolymer processing acid in accordance with the present invention, the processability of the above polymeric material is improved without any substantial degradation in the physical characteristics of the system.

EXAMPLE 16

The procedure of Example 2 is repeated except that the graft copolymer is replaced with the following:
(A) a graft copolymer of methyl methacrylate and styrene on poly(methyl vinyl ether) 50/20/30,
(B) a graft copolymer of styrene, methyl methacrylate acrylonitrile on poly(methyl vinyl ether) 55/15/5/20.

Again substantially improved results are seen to occur.

As shown by the above specific examples and as described previously, the present invention relates to certain novel polymeric compositions which, due to the presence of a minor amount of a graft copolymer as previously described have improved processability characteristics. In this regard, the present invention relates to the improvement of the processability of a normally difficultly processable polymer, e.g., polyvinyl chloride and related resins, by incorporating therein a minor amount of a processing aid comprising a graft copolymer of methyl methacrylate on an alkyl vinyl ether backbone polymer or copolymer. As indicated above, such improvement of the processability of the base resin is achieved without any substantial loss in the good physical properties of the resin.

What is claimed is:

1. An easily processable vinyl chloride polymer composition comprising:
   (A) a normally difficulty processable thermoplastic resin selected from the class of polyvinyl chloride and its chlorination products; and
   (B) in an amount sufficient to effect an improvement in the processability of said resin (A), a graft copolymer comprising methyl methacrylate units grafted onto an alkyl vinyl ether backbone polymer, the methyl methacrylate units being present in an amount of 10–95% by weight and the alkyl vinyl ether backbone polymer, comprising a homopolymer or copolymer or mixtures thereof of one or more alkyl vinyl ethers wherein the alkyl group contains from 1–32 carbon atoms, being present in an amount of 5–90% by weight based on the total weight of the graft copolymer.

2. The composition of claim 1 wherein said normally difficulty processable thermoplastic resin (A) is a vinyl chloride polymer.

3. The composition of claim 2 wherein said normally difficulty processable thermoplastic resin is chlorinated poly(vinyl chloride).

4. The composition of claim 1 wherein said graft copolymer is present in an amount of about 0.5% to about 10% by weight of said composition.

5. The composition of claim 1 wherein said graft copolymer methyl methacrylate units are present in an amount of 65% to 90% by weight and the alkyl vinyl ether backbone polymer units are present in an amount of 10% to 35% by weight based on the weight of the graft copolymer.

6. The composition of claim 5 wherein said graft copolymer is present in an amount of about 0.5% to about 10% by weight of said composition.

7. The composition of claim 6 wherein said normally difficultly processable thermoplastic resin is poly(vinyl chloride).

8. The composition of claim 1 wherein said graft copolymer methyl methacrylate units are present in an amount of 65% to 90% by weight and the alkyl vinyl ether backbone polymer units are present in an amount of 10% to 35% by weight based on the weight of the graft copolymer.

9. The composition of claim 1 wherein said graft copolymer additionally contains up to 80% by weight styrene and up to 10% by weight acrylonitrile based on the total weight of the graft copolymer.

References Cited
UNITED STATES PATENTS

| 3,373,229 | 3/1968 | Philpot et al. | 260—899 |
| 3,231,554 | 1/1966 | Kern | 260—899 |
| 3,251,904 | 5/1966 | Souder et al. | 260—876 |
| 3,168,594 | 2/1965 | Hoshi et al. | 260—899 |
| 3,316,192 | 4/1967 | Seibel | 260—899 |
| 3,287,443 | 11/1966 | Saito et al. | 260—876 |

SAMUEL H. BLECH, Primary Examiner

U.S. Cl. X.R.

260—31.8 M, 80.3 E, 91.1 M, 881, 885